(12) United States Patent
Meidl et al.

(10) Patent No.: US 11,497,301 B2
(45) Date of Patent: Nov. 15, 2022

(54) BRUSH HEAD MANUFACTURING METHODS USING A MOLDED TUFT CARRIER AND BASE PLATE

(71) Applicant: KONINKLIJKE PHILIPS N.V., Eindhoven (NL)

(72) Inventors: Michael Meidl, Seeboden (AT); Martin Varch, St. Margareten (AT); Florian Kopeinig, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 173 days.

(21) Appl. No.: 16/758,333

(22) PCT Filed: Jun. 20, 2018

(86) PCT No.: PCT/EP2018/066339
§ 371 (c)(1),
(2) Date: Apr. 22, 2020

(87) PCT Pub. No.: WO2019/081073
PCT Pub. Date: May 2, 2019

(65) Prior Publication Data
US 2020/0315334 A1    Oct. 8, 2020

Related U.S. Application Data

(60) Provisional application No. 62/576,149, filed on Oct. 24, 2017.

(51) Int. Cl.
*A46D 3/00* (2006.01)
*A46B 9/04* (2006.01)
(Continued)

(52) U.S. Cl.
CPC ............... *A46D 3/005* (2013.01); *A46B 9/04* (2013.01); *A46B 2200/1066* (2013.01);
(Continued)

(58) Field of Classification Search
CPC ................. A46D 3/045; A46D 3/005
(Continued)

(56) References Cited

U.S. PATENT DOCUMENTS 5,970,564 A    10/1999   Inns
8,069,524 B2  12/2011   Kraemer
(Continued)

FOREIGN PATENT DOCUMENTS

CN    103037734 A    4/2013
DE    10221786 A1    11/2003
(Continued)

OTHER PUBLICATIONS

Computer generated English translation of WO 2004080238 A1, Clos, Sep. 2004. (Year: 2004).*
(Continued)

*Primary Examiner* — Laura C Guidotti

(57) ABSTRACT

A method for manufacturing a brush head (10). The method includes molding a tuft carrier (50) having at least one retention element (52) that are positioned relative to a handling plate (101). Excess material (59) may be removed from the tuft carrier. The retention elements are loaded into recesses of the handling plate. A bristle tuft (21) comprised of a plurality of bristles (22) is inserted into the opening (51) of each retention element. A proximal end (23) of each bristle tuft (21) is bonded together with at least a portion of the proximal side (53) of each corresponding retention element (52) to form a merged proximal end head portion (26) that secures the bristle tufts and retention elements together as a plurality of merged tuft assemblies (20). A platen (42) of a neck (40) is positioned in relation to the merged tuft assemblies using a cavity in a base plate. A
(Continued)

matrix material (30) is overmolded to at least partially encompass the platen and the merged tuft assemblies and form the brush head.

8 Claims, 13 Drawing Sheets

(51) Int. Cl.
    *B29C 45/14*     (2006.01)
    *B29L 31/42*     (2006.01)

(52) U.S. Cl.
    CPC .................. *B29C 45/14385* (2013.01); *B29C 2045/14393* (2013.01); *B29L 2031/425* (2013.01)

(58) Field of Classification Search
    USPC .......................................................... 300/21
    See application file for complete search history.

(56) References Cited

U.S. PATENT DOCUMENTS

| | | | |
|---|---|---|---|
| 10,500,024 B2 * | 12/2019 | Dengler | A46B 3/04 |
| 10,575,627 B2 * | 3/2020 | Dengler | A46B 3/06 |
| 2005/0146200 A1 | 7/2005 | Stein et al. | |
| 2010/0088836 A1 | 4/2010 | Kirchhofer et al. | |
| 2017/0086572 A1 | 3/2017 | Dengler | |

FOREIGN PATENT DOCUMENTS

| | | | |
|---|---|---|---|
| DE | 20301634 U1 | 6/2004 | |
| DE | 102005029366 A1 * | 1/2007 | ............... A46B 3/04 |
| DE | 202011106118 U1 | 1/2012 | |
| EP | 1603429 B1 | 8/2007 | |
| JP | 4862242 B2 | 1/2012 | |
| WO | WO 2004080238 A1 * | 9/2004 | ............... A46B 3/06 |
| WO | 2016105357 A1 | 6/2016 | |
| WO | 2016181278 A1 | 11/2016 | |
| WO | 2016181291 A1 | 11/2016 | |
| WO | 2016181322 A1 | 11/2016 | |
| WO | 2017009354 A1 | 1/2017 | |

OTHER PUBLICATIONS

Computer generated English translation of DE 102005029366 A1, Schubnell, Jan. 2007. (Year: 2007).*

International Search Report and Written Opinion, International Application No. PCT/EP2018/066339, dated Dec. 17, 2018.

* cited by examiner

BRUSH HEAD MANUFACTURING METHODS USING A MOLDED TUFT CARRIER AND BASE PLATE

This application is the U.S. National Phase application under 35 U.S.C. § 371 of International Application No. PCT/EP2018/066339, filed on 20 Jun. 2018, which claims the benefit of U.S. Provisional Application No. 62/576,149, filed 24 Oct. 2017. These applications are hereby incorporated by reference herein.

FIELD OF THE INVENTION

The present disclosure is directed generally to methods for manufacturing a brush head assembly using molded tuft carriers and a base plate.

BACKGROUND

The brush heads of both manual and power toothbrushes comprise bristles which are used to clean the teeth, tongue, and cheeks. In some toothbrushes, the bristles are stapled, or anchored, into the neck portion of the brush head. In other toothbrushes, the bristles are held in the head without staples, in methods commonly known as "anchor free tufting".

There are several ways to manufacture brush heads having anchor-free tufting. In one method, groups, or tufts, of individual bristles are melted or fused together at one end, and then the bristle tufts are overmolded with a material that then hardens, forming a brush head. In another method, bristle tufts that are fused at one end are inserted into holes in the brush neck, and either the neck material is heated to shrink around the bristle tufts, or the brush neck with the inserted bristle tufts are over-molded. However, there are limitations and difficulties with each of these current manufacturing methods such that the manufacturing methods are slow, involve multiple steps and equipment, or have higher than acceptable failure rates, resulting in loose bristles or bristle tufts which can come out of the brush head during use.

Accordingly, there is a need in the art for methods and apparatus for more efficiently manufacturing brush heads with anchor free tufting.

SUMMARY OF THE INVENTION

The present disclosure is directed to inventive methods for manufacturing a brush head with secured bristle tufts. Various embodiments and implementations herein are directed to manufacturing methods in which a tuft carrier is molded with retention elements having openings formed therethrough, which are used to retain tufts of bristles. The tuft carrier can be molded or otherwise placed on and/or in a handling plate to assist in manufacturing processes. As one example, the tuft carrier (e.g., with handling plate) can be loaded into a stamping tool and separated into individual retention elements, or otherwise have excess portions of the tuft carrier removed. The stamping can be used to directly stamp the retention elements into corresponding recesses of a base plate also loaded into the stamping tool.

The processed tuft carriers can be set aside for further processing at a later time or immediately proceed to the next manufacturing step. This could enable different portions of the manufacturing process to occur at different times, and/or at different manufacturing locations. Additional manufacturing processes may include those such as inserting a bristle tuft into the opening of each of the retention elements, trimming one or both ends of bristle tufts, retaining a bristle tuft in a retention element, combining a brush neck with bristle tufts, and a variety of other processes. Once the bristle tufts have been inserted into the openings in the retention elements, either or both ends of the bristle tufts can be trimmed or adjusted to achieve a desired length or contour, e.g., to define what will become the brushing surface for the brush head, and/or to achieve a uniform length of the bristle tufts on the proximal side of the tuft carrier to facilitate bonding.

The processed proximal end of the bristle tufts, or in some arrangements the proximal end of the bristle tufts and a proximal side of the retention elements can be bonded or merged together, such as by using a laser or other heat source, chemical melting or adhesives to form a merged proximal end head portion by which the bristle tufts and retention elements are secured together such that merged tuft assemblies are formed. Optionally, after the bonding process, if not done previously, excess material can be removed from the tuft carrier, e.g., separated into individual merged tuft assemblies. Subsequently, the merged tuft assemblies can be overmolded, e.g., together with a neck for the brush head, in a matrix such as an elastomeric matrix. The various embodiments and implementations herein provide a cost-effective and efficient production of brush heads with anchor free bristle tufts is substantially improved.

Generally, in one aspect, a method for manufacturing a brush head with a base plate is provided. The method includes molding one or more tuft carriers, together having a plurality of retention elements, each retention element having an opening therethrough; positioning the retention elements in openings of a handling plate; removing excess material from the one or more tuft carriers; loading the plurality of retention elements into corresponding recesses of the base plate; inserting a bristle tuft into the opening of each retention element; bonding a proximal end of each bristle tuft together with a proximal side of each corresponding retention element to form a merged proximal end head portion that secures the bristle tufts and retention elements together as a plurality of merged tuft assemblies; positioning a platen of a neck of the brush head in relation to the merged tuft assemblies using a cavity in the base plate; and overmolding a matrix material in the base plate to at least partially encompass the platen and the plurality of merged tuft assemblies.

In one embodiment, the loading occurs directly as a result of the stamping. In one embodiment, the molding includes overmolding the one or more tuft carriers onto the handling plate. In one embodiment, the one or more tuft carriers are removed from the handling plate as a result of the stamping.

In one embodiment, the bristle tufts and retention elements are made of a same or similar material having the same or similar melting point. In one embodiment, the openings in the retention elements have differing shapes, sizes, or a combination including at least one of the foregoing. In one embodiment, the bonding includes applying heat to melt the bristle tufts and the retention elements together into the merged proximal end head portions.

In one embodiment, the excess material includes some or all of a carrier plate, a webbing link, or a combination including at least one of the foregoing. In one embodiment, the retention elements are loaded into the base plate interconnected by a carrier plate, a webbing link, or a combination including at least one of the foregoing.

Generally, in another aspect, a base plate for manufacturing a brush head is provided. The base plate includes a plurality of recesses, each configured to receive a retention element of a tuft carrier therein; a plurality of tuft bores extending from the recesses, each configured to receive a bristle tuft therein; a recessed area configured to position a manufacturing plate positioned above the plurality of recesses; an adjustment feature configured to set one or more characteristics of a free end of the bristle tufts; and a cavity shaped to receive a neck of the brush head and configured to at least partially encapsulate a platen of the neck and the retention elements with a matrix material injected into the cavity when the neck is positioned in the cavity and the retention elements are positioned in the recesses.

In one embodiment, the manufacturing plate is a handling plate holding the tuft carrier.

Generally, in another aspect, a manufacturing system includes a base plate and a stamping tool, wherein the base plate is configured to be loaded into the stamping tool with the tuft carrier and the handling plate, and the stamping tool is configured to stamp the retention elements from the handling plate directly into the recesses of the base plate.

Generally, in another aspect, a manufacturing system includes a base plate and a tufting unit, wherein the base plate is configured to be loaded into the tufting unit and the tufting unit is configured to insert a bristle tuft into each an opening in each of the retention elements.

In one embodiment, the manufacturing plate includes a cutting plate having a height, the cutting plate configured to set a proximal length of the bristle tuft to equal the height when the bristles are trimmed with the cutting plate installed in the base plate.

In one embodiment, the adjustment feature is configured to receive the free end of the bristle tufts and includes one or more blind holes, one or more adjustable pins, a contour insert having a contoured surface, or a combination including at least one of the foregoing.

Generally, in one embodiment, a brush head is provided. The brush head includes a plurality of merged tuft assemblies, each comprising: a plurality of bristle tufts each comprising a plurality of bristle strands and having a free end and a proximal end; a plurality of retention elements each having an opening therethough configured to receive one of the bristle tufts, the retention elements included by a tuft carrier during assembly and formed at least partially by inserting the retention elements into one or more openings of a handling plate and removing excess material from the tuft carrier using the handling plate; and a plurality of proximal end head portions each formed by bonding the proximal end of each bristle tuft to each corresponding retention element; a neck having a platen; and a matrix material at least partially encompassing the platen and the retention elements of the merged tuft assemblies.

In one embodiment, the retention elements and bristle tufts are composed of a same or similar material. In one embodiment, the proximal end head portions are formed by the bristle tufts melted together with the retention elements. In one embodiment, the plurality of merged tuft assemblies are interconnected in a tuft carrier web or a tuft carrier plate. In one embodiment, the matrix material is an elastomeric material.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method for manufacturing a brush head assembly with bristle tufts retained by anchor free tufting in a retention element secured in a molded elastomeric matrix. More generally, applicants have recognized the need for improvements in manufacturing methods and products made using anchor free tufting. By molding carriers, and in some arrangements, molding carriers from the same or similar material as the bristle tufts, efficiencies in manufacturing are achieved with improved product quality.

Figure 1A:
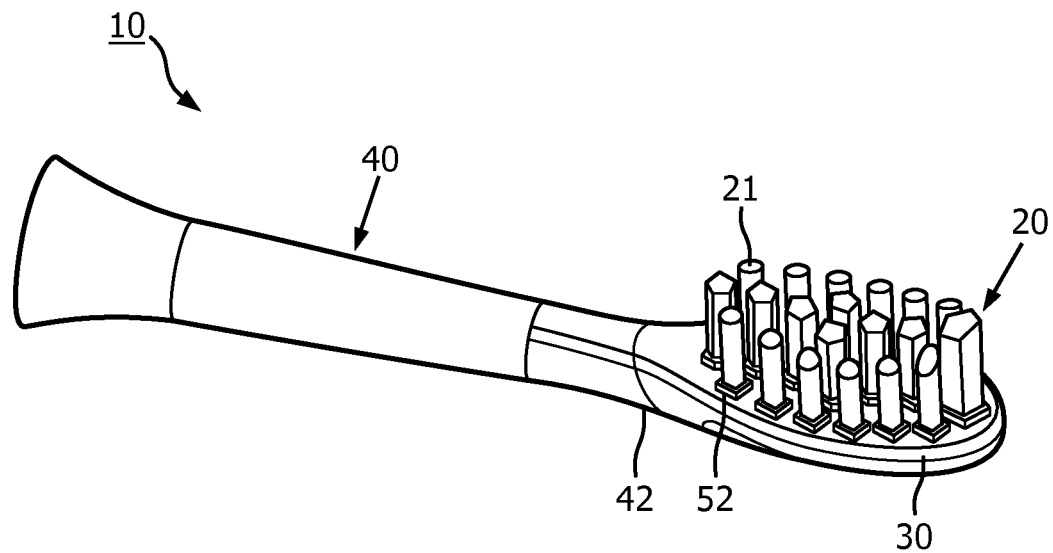
FIG. 1A is a perspective schematic representation of a brush head assembly in accordance with an embodiment.
Figure 1B:
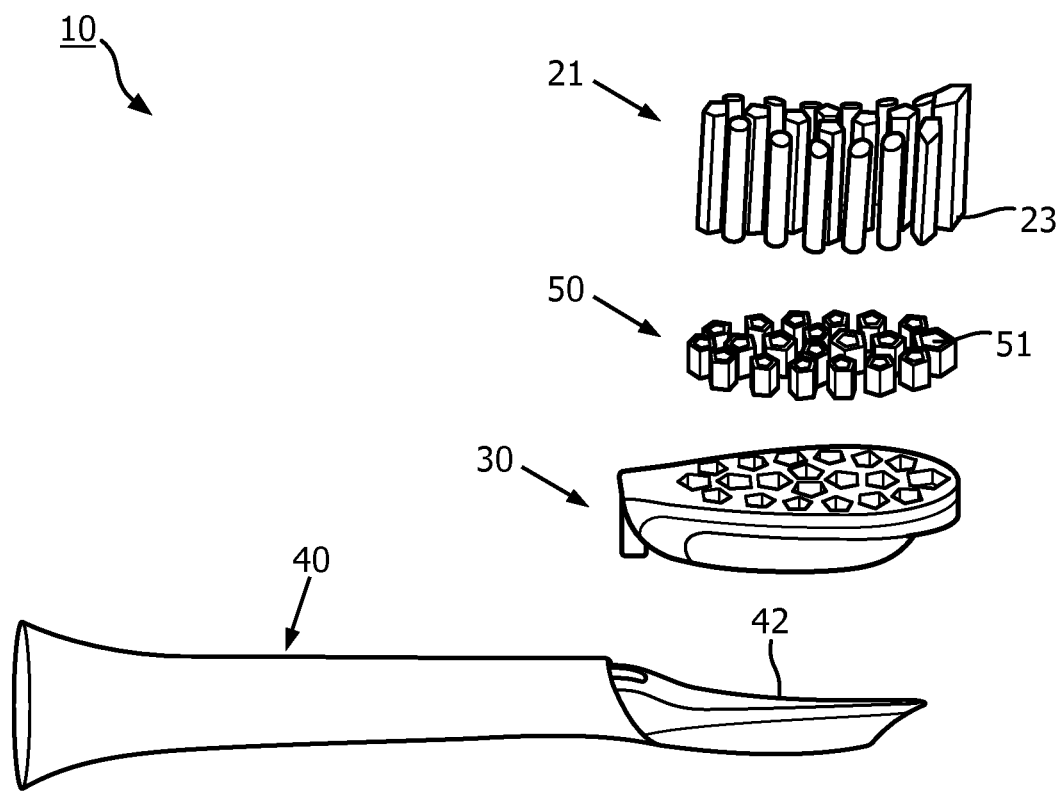
FIG. 1B is a perspective exploded view of the brush head assembly of FIG. 1A.

Referring to FIGS. 1A-1B, in one embodiment, a schematic representation of a brush head assembly 10 is provided. More particularly, the brush head assembly 10 may include, but is not limited to, a plurality of bristle tufts 21 disposed within a matrix material 30 at a distal end of a neck 40. That is, a distal portion 42 of the neck 40, which may be referred to as a platen, may be at least partially enclosed in and connected to the matrix material 30. The merged tuft assemblies 20 may include a tuft carrier 50 having one or more retention elements 52, in which bristle tufts 21 are secured as discussed in more detail herein. The neck 40 can be coupled to, or form a part of, any manual or powered toothbrush shaft. For example, the neck 40 may be configured to be removably coupled to an actuator or drive shaft (not shown) of a powered oral care device (e.g., electric toothbrush) now known or to be developed.

Figure 2A:
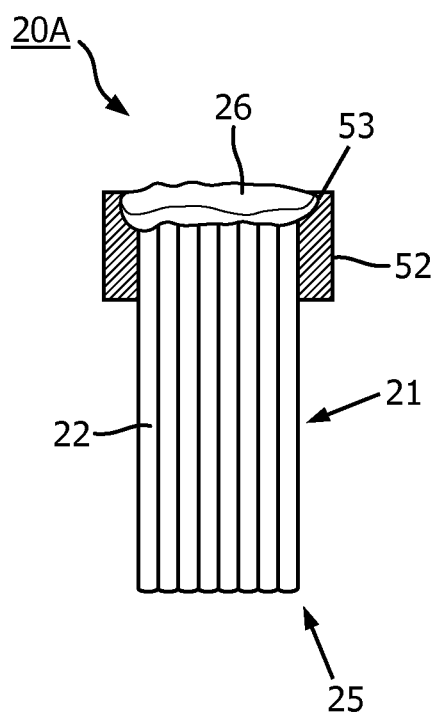
FIGS. 2A and 2B are cross-sectional side views of schematic representations of merged tuft assemblies according to two embodiments disclosed herein.
Figure 2B:
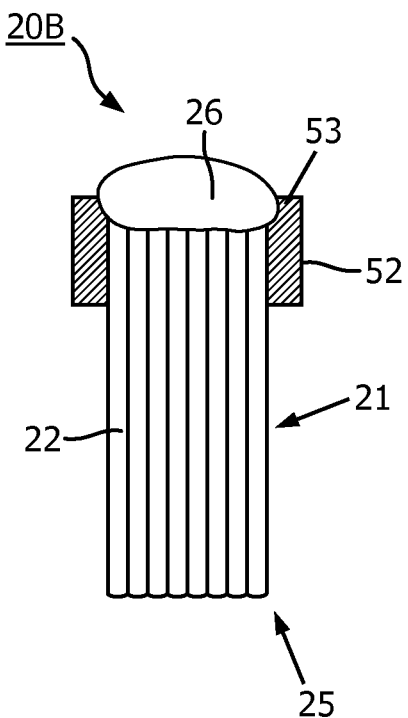

Two examples for the merged tuft assemblies 20 are illustrated in FIGS. 2A and 2B, designated as merged tuft assemblies 20A and 20B, respectively. It is to be appreciated that the reference numeral '20' is intended to generally refer to any of the merged tuft assemblies disclosed herein, while the assemblies 20A and 20B are used herein to facilitate discussion with respect to particular embodiments. It is also to be appreciated that many components of the merged tuft assemblies 20 are shared throughout embodiments, and thus referred to with the same reference numerals.

Figure 2C:
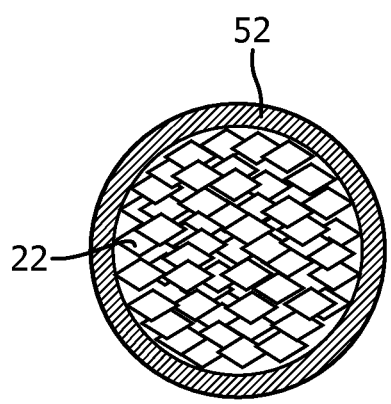
FIG. 2C is a bottom view of a bristle tuft engaged in a retention element of a tuft carrier.

Referring to FIGS. 1-2C, each bristle tuft 21 comprises a plurality of bristle strands 22, which are secured in the retention elements 52 of tuft carrier 50. Each bristle tuft 21 has a proximal end 23 and a free end 25. The proximal end 23 of each bristle tuft 21 is retained within an opening 51 of each of the retention elements 52 of the tuft carrier 50, while the free end 25 is located opposite to the proximal end 23 and forms the brushing surface force the brush head 10 when assembled. The bristle tufts 21 can be formed to a shape and diameter to match the size and shape of the openings 51 in the retention element 52.

It is to be appreciated that the various components of the brush head 10 may take any desire size, shape, and/or orientation. For example, as seen in FIG. 1A, the retention elements and bristle tufts contained therein can be round, pentagonal, hexagonal, or a variety of other shapes, such as squares, diamonds, hexagons, heptagons, octagons, etc. Additionally, the retention elements 52 and the openings 51 therein can be of the same size, shape and arrangement as each other, or different shapes and sizes. For example, the retention element 52 may have a first shape defining its periphery, while the opening 51 has a second, different shape defining the shape of the bristle tuft 21 inserted therethrough.

Once the bristle tufts 21 are inserted in the opening 51 of the retention element 52, the proximal end 23 of the bristle tufts 21, or in some arrangements, the proximal end 23 of the bristle tufts 21 and at least a portion of a proximal side 53 of the retention element 52 are bonded together to form a merged proximal end head portion 26. That is, the merged proximal head portion 26 may be formed from fused material from the bristles 22 alone, or the bristles 22 together with a portion of the retention element 52 adjacent to the bristles 22. In one embodiment, the bristle tufts and/or the retention elements 52 are bonded together by any suitable process such as welding (ultrasonic, laser, etc.), melting, adhesives, etc.

In order to facilitate formation of the merged proximal head portion 26 such as shown in FIGS. 2A-2B, the tuft carriers 50 and the bristle tufts 21 are preferably made from the same material, or materials having a similar composition. Plastics such as Acrylonitrile Butadiene Styrene (ABS), polyamide (PA) or nylon, polypropylene, or variations or combinations of these or other materials can be used. Particularly useful are combinations of materials that have a similar co-efficient of melting to facilitate bonding by melting and cooling at a similar temperature and rate. In one embodiment, the bristles 22 are formed from PA, while the retention elements 52 are formed from a PA/ABS blend. It is to be appreciated that there may be some variability across the weld of the merged proximal end head portion 26, e.g., based on the characteristics of the materials of the bristle strands 22 and/or the retention elements 52, as well as the parameters utilized during welding. In particular, variation may occur if the bristle tuft 21 and the retention elements 52 are made of different materials, which may cause melting/cooling at different temperatures, or other differences due to their different chemical compositions. However, such variability is acceptable as long as the desired bonding is achieved.

The tuft carriers 50 and/or retention elements 52 can be formed in a variety of ways, such as molding, stamping, etc., as discussed in more detail herein. Various embodiments for the tuft carriers 50 can be appreciated in FIGS. 3A-3F. The reference numeral '50' as used herein is intended to refer generally to all embodiments of tuft carriers disclosed or envisioned, while alphabetic suffixes (e.g., 'A', 'B', etc.) have been provided to facilitate discussions of particular embodiments shown in the Figures. A similar naming style may be utilized with respect other components herein.

Figure 3A:
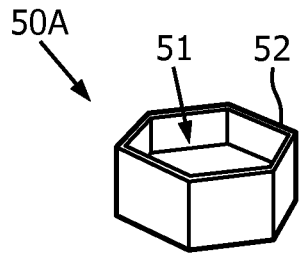
FIGS. 3A-3F are schematic representations of tuft carriers according to different embodiments disclosed herein.
Figure 3B:
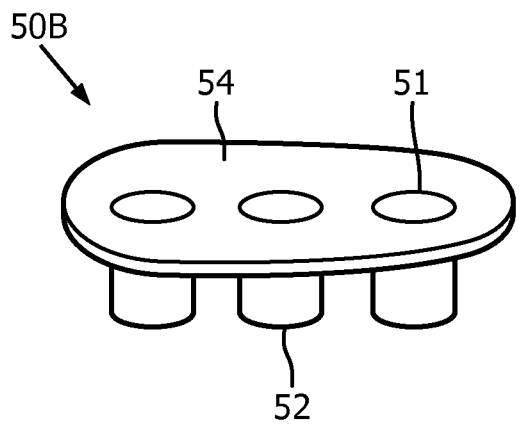
Figure 3C:
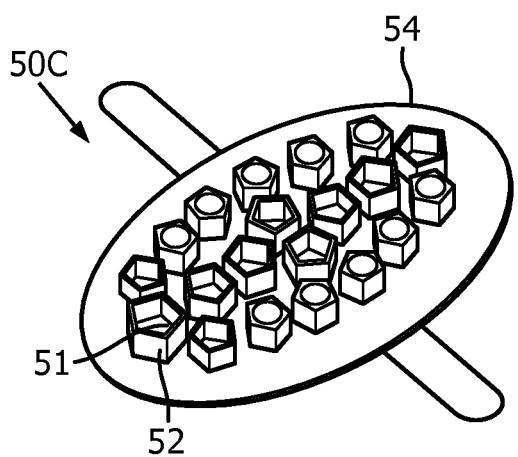
Figure 3D:
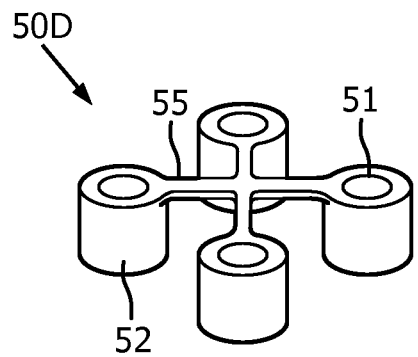
Figure 3E:
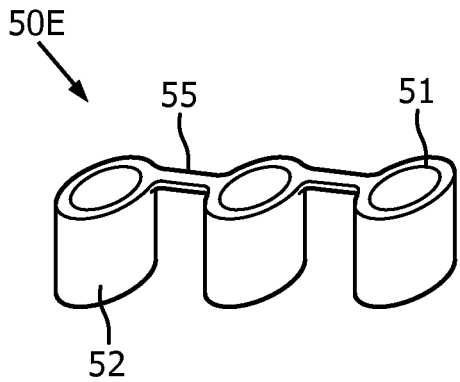
Figure 3F:
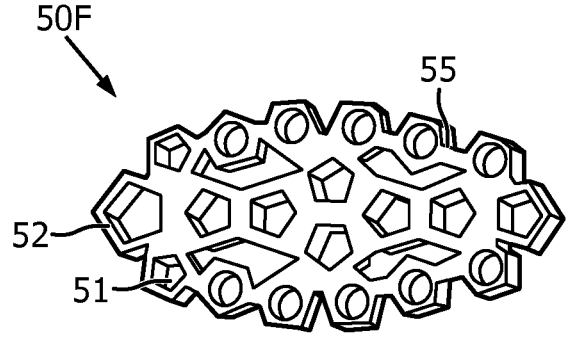

A tuft carrier 50A in FIG. 3A comprises a single one of the retention elements 52, which will hold at least one of the bristle tufts 21 in the opening 51 of the retention element 50A. FIGS. 3B and 3C respectively show a tuft carrier 50B and a tuft carrier 50C that each comprises a carrier plate 54 having a plurality of the retention elements 52 having openings 51 therethrough, connected together, e.g., arranged in a shape of the final brush head or some portion thereof. In FIGS. 3D-3F, tuft carriers 50D, 50E, and 50F are respectively shown. Each of the tuft carriers 50D-50F comprise a tuft carrier web that has a plurality of individual retention elements 52 connected to each other by a series of strands or webbing links 55. In this way, it is to be appreciated that the retention elements 52 can be separate discrete units, or interconnected together, such as by the carrier plate 54 or the webbing links 55. Similar to the tuft carriers 50B and 50C, the retention elements 52 and/or the openings 51 of the tuft carriers 50D-50F may be arranged in the desired pattern for the tufts 21 when the brush head is fully assembled, or some portion thereof.

In one embodiment, the tuft carriers 50 are formed via a molding operation, such as injection molding. The actual shape and size of the tuft carrier 50, the number, size, and shape of the openings 51, etc., can be set and determined by the mold used to form the carrier 50. Once the carrier 50 has been formed and cooled, it can optionally be removed from the mold, and is ready for further processing, either immediately, or at a later time and/or place.

Figure 4:
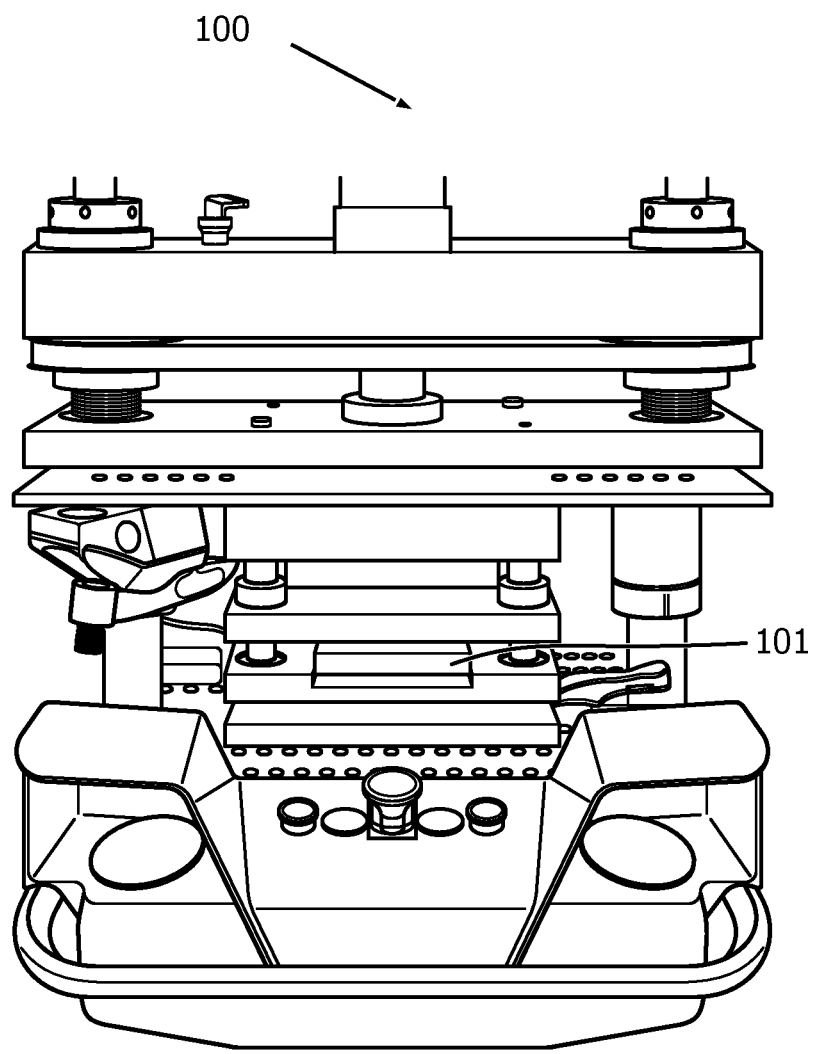
FIG. 4 is a representation of a stamping tool for manufacturing a brush head assembly of the present invention.
Figure 5A:
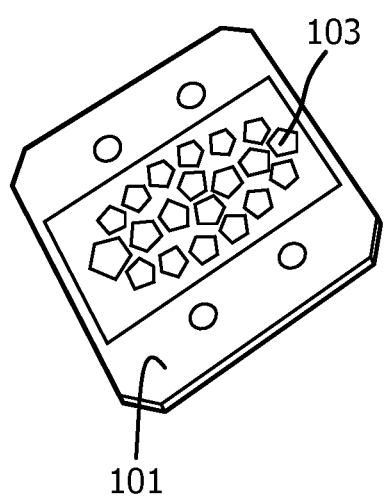
FIGS. 5A-5C show successive steps of using a die block or handling plate to stamp out retention elements of a tuft carrier according to one embodiment disclosed herein.
Figure 5B:
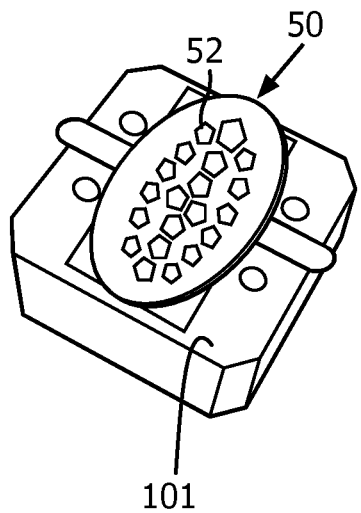

According to embodiments disclosed and envisioned herein, at least a portion of the tuft carrier 50 may be removed prior to assembly of the retention elements 52 in the brush head 10. In one embodiment, the removal of excess material is performed by a stamping tool 100 shown in FIG. 4. For example, the stamping tool 100 may include a press, ram, stamp, or die that forcibly engages the tuft carrier 50 placed in a die block or handling plate 101, as shown in FIG. 5B, to cut apart, disconnect, or otherwise separate one or more portions of the tuft carrier 50 from each other.

Figure 5C:
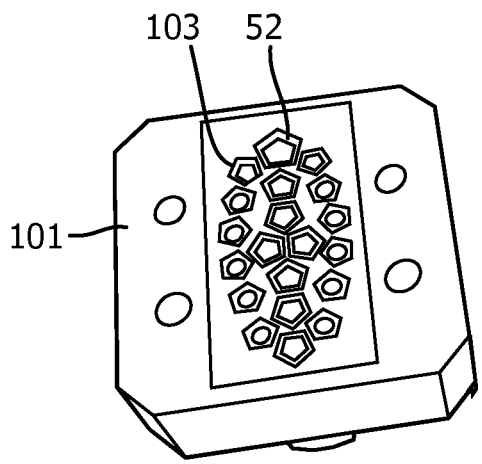
Figure 5C:
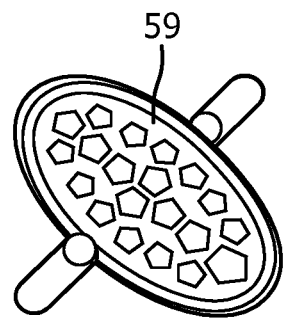

The die block or handling plate 101 has a series of openings 103 configured to match the retention elements 52 in the tuft carrier 50 in size, shape and arrangement. Namely, the openings 103 of the die block or handling plate 101 of FIGS. 5A-5C correspond to the size, shape, and layout of the tuft carrier 50C from FIG. 3C. In this way, as shown in FIG. 5B, the retention elements 52 of the tuft carrier 50 can be inserted into the openings 103 of the die block or handling plate 101. Thereafter, the tuft carrier 50, can be processed, e.g., stamped by the stamping tool 100. As shown in FIG. 5C, the stamping operation may disconnect or separate the retention elements 52 from excess material 59. The excess material 59 may be recycled or discarded, while the retention elements 52 may remain in the openings 103 of the handling plate 101, or be removed, for further processing. The handling plate 101 may be utilized to facilitate the general handling of the tuft carrier 50 and/or the loading of the tuft carrier 50 into other tools, such as a tufting unit, or other equipment used to create a finished brush head 10. In one arrangement of the present invention, the handling plate 101 with the tuft carrier therein can be positioned on top of a base plate 110 with openings of similar size and shape in similar positions and the tuft carrier may be transferred from the handling plate into the base plate 110. It is also noted that some or all of the excess material 59 of a tuft carrier 50 may be removed via other processes, e.g., cutting, or via multiple successive processes, at this step or other steps in the manufacturing process.

Figure 6A:
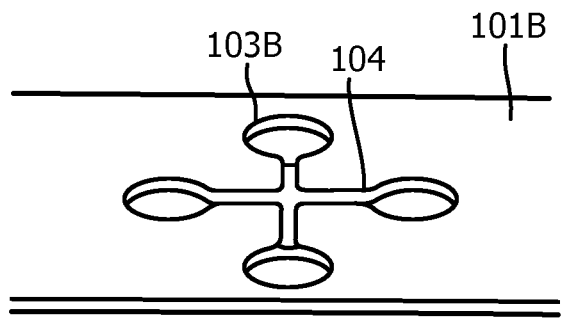
FIGS. 6A-6B show a handling plate and the handle plate engaged with a tuft carrier according to one embodiment disclosed herein.
Figure 6B:
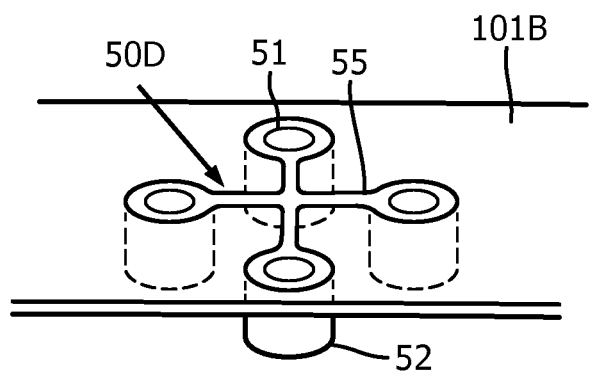

To facilitate handling of a variety of tuft carriers 50, one or more die blocks or handling plates 101 may be used. A die block or handling plate, designated herein in particular as handling plate 101B is illustrated in FIGS. 6A-6B. Namely, the handling plate 101B includes openings 103B, which correspond in shape, size, and layout to the retention elements 52 of the tuft carrier 50D of FIG. 3D, as shown in FIG. 6B. The openings 103B in the handling plate 101B facilitate stamping of the tuft carrier 50D directly into the handling plate 101B. Additionally, the handling plate 101B may include a set of grooves or recesses 104, which are shaped and sized to receive the webbing links 55 of the tuft carrier 50D. In this way, for example, the grooves 104 may assist in positioning and holding the tuft carrier 50D during manufacturing. It is noted that the handling plates 101 disclosed and envisioned herein may be removably separated from the base plate 110 or mold or other components of the stamping tool 100, e.g., to facilitate further processing of the corresponding tuft carrier conveyed by the handling plate 101. In this way, the handling plate 101B, together with the tuft carrier 50 stamped into the handling plate, may be separated from any excess material if desired, for further processing.

Figure 7A:
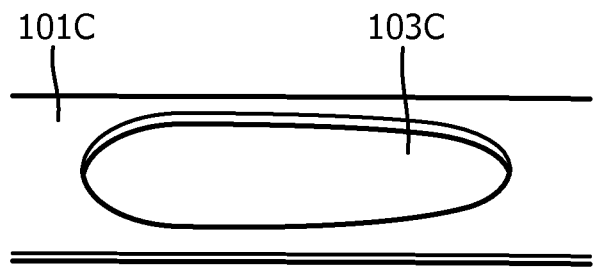
FIGS. 7A-7B show a handling plate and the handle plate engaged with a tuft carrier according to one embodiment disclosed herein.
Figure 7B:
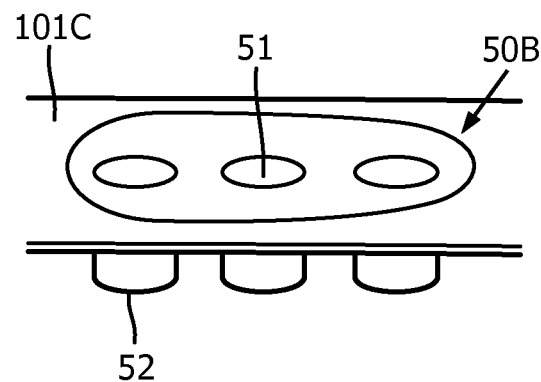

A handling plate 101C, according to another embodiment is illustrated in FIGS. 7A-7B. Unlike handling plate 101B, the handling plate 101C includes an opening 103C, which corresponds in general shape, size, and/or layout to the carrier plate 54 of the tuft carrier 50B of FIG. 3B (as opposed to the individual retention elements 52). In this way, some or all the carrier plate 54 may remain with the retention elements 52 for various manufacturing steps, and/or may be included in the brush head 10 during final assembly. For example, in one embodiment, the stamping tool 100 may be configured, with a punch element to remove only a portion of the carrier plate 54 so as to change the shape of tuft carrier 50B to the shape of the tuft carrier 50F of FIG. 3F. In other words, excess portions of the carrier plate 54 may be removed to leave behind only the webbing links 55. In other embodiments, the carrier plate 54 may be utilized without removing any excess portions.

In one embodiment, the tuft carrier 50 is formed by overmolding the tuft carrier 50 directly onto the corresponding handling plate or die block 101. In this way, the handling plate 101, together with the unprocessed instance of the tuft carrier 50, can be directly placed on the base plate 110 and processed by manufacturing equipment, e.g., stamped by the stamping tool 100. The handling plates 101 may be made of any desired material, such as a metal or other rigid material to facilitate handling of the tuft carrier 50 when engaged with the handling plate 101, as well as to promote reusability of the handling plate 101 for multiple stampings or other manufacturing processes.

Figure 8A:
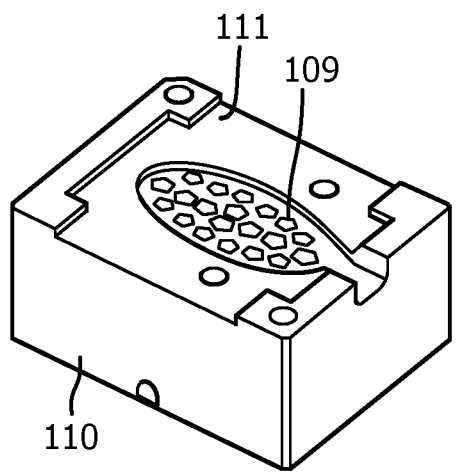
FIGS. 8A and 8B show a perspective view and a perspective cross-sectional view of a base plate according to one embodiment disclosed herein.
Figure 8B:
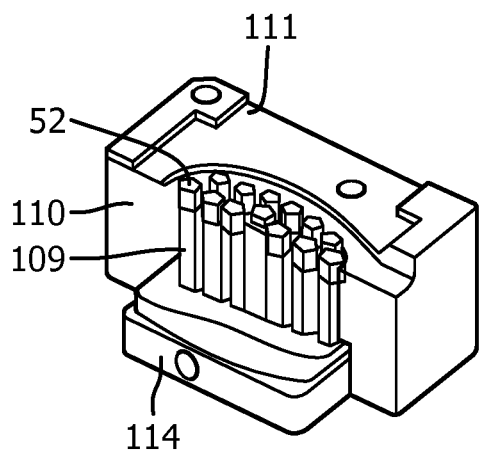
Figure 9:
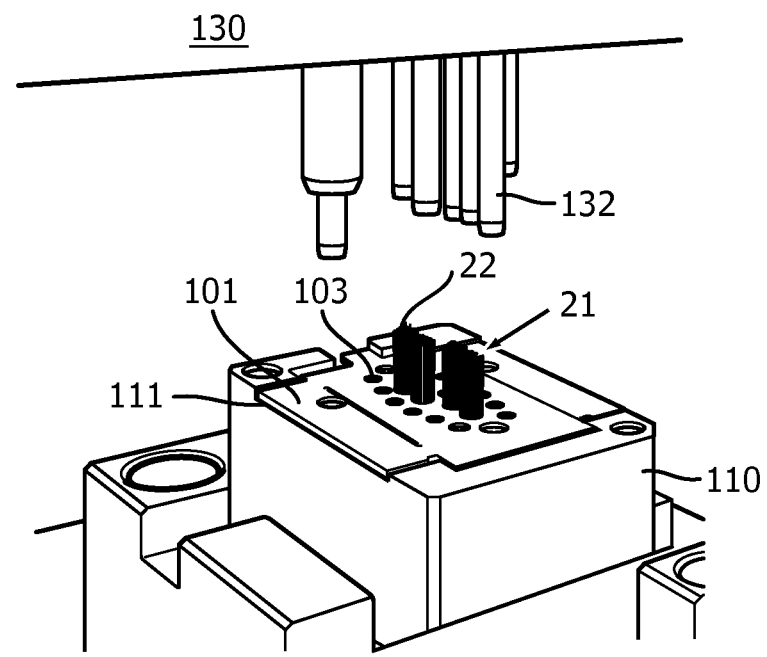
FIG. 9 shows a base plate loaded in a tufting unit according to one embodiment disclosed herein.

One embodiment for a base plate 110 is shown in FIG. 8A and cross-sectionally in FIG. 8B. The base plate 110 includes a recessed area 111 configured to receive the handling plates 101 or other manufacturing plates as discussed herein (as shown in FIG. 9). In this way, according to one embodiment, the base plate 110, together with the handling plate 101 placed in the recessed area 111, can be used during stamping to stamp the retention elements 52 directly into corresponding openings 109 in the base plate 110. The base plate 110 in FIG.8B is illustrated having the retention elements 52 already inserted in the openings 109 via stamping as discussed above, or by some other process such as manual insertion. As noted above, the tuft carrier 50a may comprise individual retention elements 52, such as shown in FIG. 8B, or the tuft carrier 50b, 50c, may comprise a plurality of retention elements 52 connected by the carrier plate 54, or the tuft carrier 50d, 50e, 50f, may comprise a plurality of retention elements 52 connected by webbing links 55.

As shown in FIG. 8B, the base plate 110 has opening 109 that correspond to each of the openings 51 in the retention elements 52. Note that, the diameter or dimensions of the openings 109 may be configured such that the retention elements 52 are held by the base plate 110 in a desired position (e.g., the openings 109 may be tapered from top to bottom). The configuration of the openings 109 is useful for defining the shape, length, configuration, and cross-sectional shape of the bristle tufts 21 that will be inserted during subsequent steps of the manufacturing process. As discussed in more detail below, the base plate 110 may include an adjustment feature configured to assist in defining the length and/or contour of the free ends 25 of the bristle tufts 21, such as a contour insert 114.

Figure 10A:
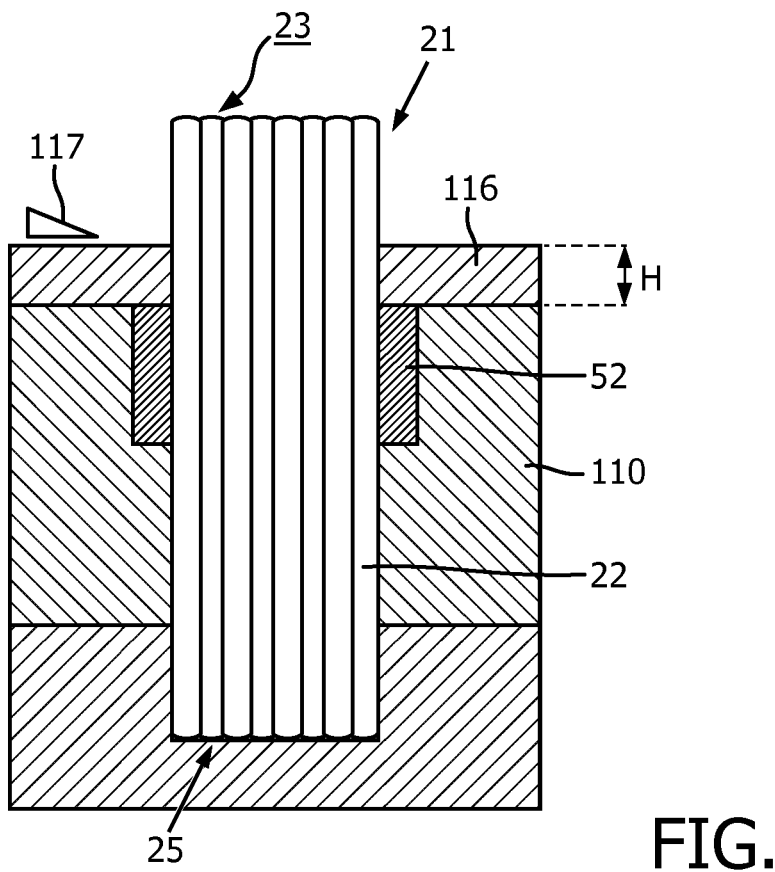
FIGS. 10A and 10B are cross-sectional views of a bristle tuft before and after a proximal end of the bristle tuft is trimmed.

FIG. 9 illustrates a tufting unit 130 according to one embodiment. The tufting unit 130 may be operated to form a plurality of bristle strands 22 into the bristle tufts 21 which are inserted into each of the plurality of openings 51 in the retention elements 52, as shown in FIG. 10A. For example, as shown in FIG. 9, the tufting unit 130 may include a tuft inserter 132 that can be aligned with corresponding openings 103 in a die block or handling plate 101 that is inserted in the base plate 110 (e.g., held in the recessed area 111). The die block or handling plate 101 includes a plurality of openings 103 therethrough. The openings 103 in the handling plate 101 are aligned with the openings 51 in the tuft carrier 50, and the openings 109 in the base plate 110. When the various openings 103, 51, 109 in the handling plate 101, tuft carrier 50 and base plate 110 are aligned, in operation, the tufting unit 130 forcibly injects the bristles therein (e.g., mechanically, via pressurized air, etc.) to form bristle tufts 21 of a shape and size that corresponds with the openings. It is to be appreciated that the handling plate 101 may be a die plate, a guide plate, or a different plate. It is noted that tufting may occur prior to the aforementioned stamping or cutting of tuft carriers, if desired.

As can be appreciated, the bristle tufts 21 must be of the proper shape, size, and diameter to fit into each respective opening. The ends of the bristle tufts 21 that are inside the base plate 110, such as shown in FIG. 10A, will become the free end 25 of the bristle tufts 21 in the brush head assembly 10, while the portion of the bristle tufts 21 that project above the base plate 110, such as shown in FIG. 9, will become the proximal end 23 of the bristle tufts 21.

Figure 10B:
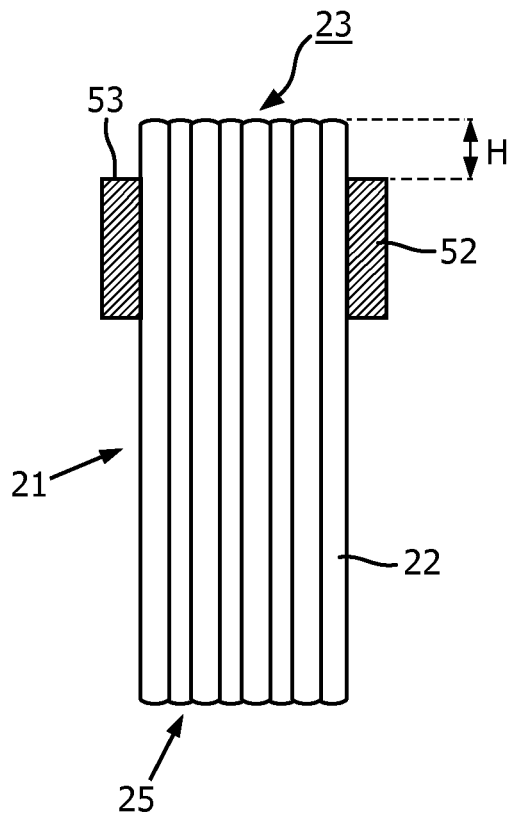

After tufting, the proximal ends 23 of the bristle tufts 21, may optionally need to be trimmed to a uniform height to ensure a proper sealing during the subsequent bonding step. To perform trimming, as shown in FIG. 10A, a cutting plate 116 having a height H can be placed in the recess 111 on the base plate 110 at the proximal end 23 of the tuft 21. The cutting plate 116 may be the same plate as the handling plate 101, or may be a different plate. A knife or cutting implement 117 can be used to trim the length of the bristle tuft 21 by removing the excess portion of the bristle tuft 21 protruding above the plate 116. In this way, as shown in FIG. 10B, the length of bristle tuft 21 extending out from a proximal side 53 of the retention element 52 will approximately equal the height H of the plate 116 when the plate 116 is removed. For example, this preset length of the proximal end 23 of the bristle tuft 21 can be useful to assist the consistent and predictable creation of the proximal end head portion 26 during bonding.

Figure 11A:
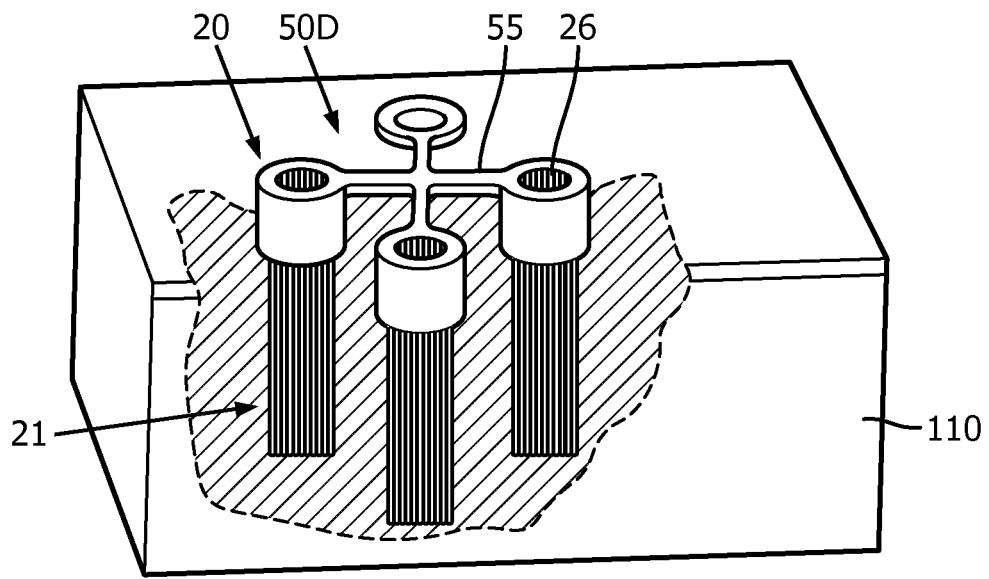
FIGS. 11A-11C illustrate tuft carriers after insertion and bonding of bristle tufts according to various embodiments disclosed herein.
Figure 11B:
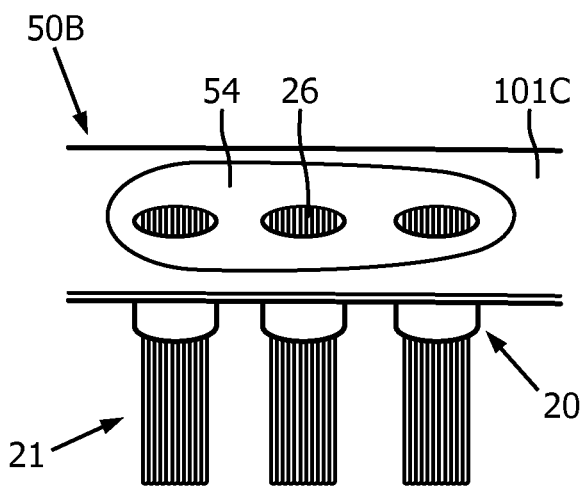
Figure 11C:
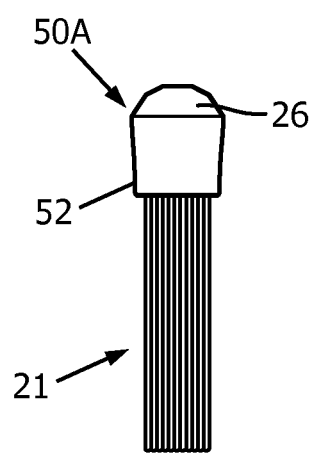

After tufting, the proximal ends 23 of the bristle tufts 21 can be bonded to the proximal side 53 of retention elements 52, e.g., by melting, welding, adhering, or other technique, to form the merged proximal end head portion 26 as noted above with respect to FIGS. 2A-2B and also shown in FIGS. 11A-11C. Three different examples of the tuft carriers 50 after tufting are shown in FIGS. 11A-11C. More particularly, FIG. 11A illustrates the tuft carrier 50D tufted with the bristle tufts 21, which extend into openings of the base plate 110. FIG. 11B illustrates the tuft carrier 50B tufted with the bristle tufts 21 while carried by the handling plate 101C. FIG. 11C illustrates the tuft carrier 50A (a single one of the retention elements 52) with the bristle tuft 21 melted to form a merged proximal end head portion 26 from at least a portion of the bristle tuft 21 and a portion of the proximal end of the retention element 52.

In one embodiment, bonding is accomplished by melting the bristle strands 22, alone or together with a portion of the retention element 52. Heat can be supplied by a heat source that comes into direct physical contact with the proximal end 23 of the bristle tufts and/or the proximal side 53 of the retention elements 52, such as a laser. Alternatively, the heat can be supplied by heated air or any of a variety of other heat sources that can be in direct physical contact, merely adjacent, or directed. As noted above, forming the bristle strands 22 and the retention elements 52 from the same or a similar material composition, may advantageously improve bonding by utilizing a same or similar melting point.

Figure 12A:
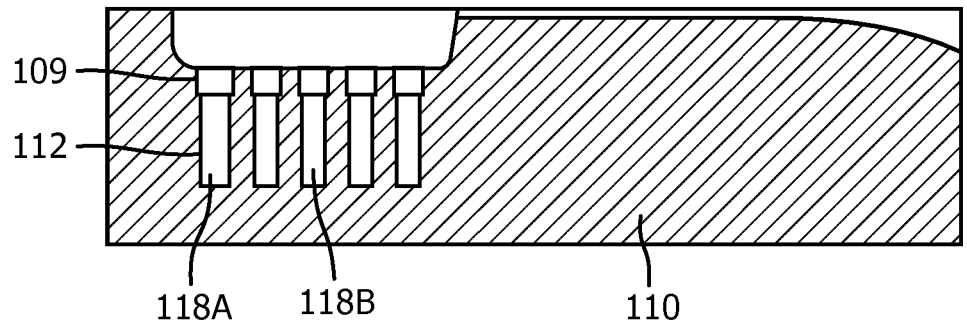
FIGS. 12A-12C illustrate a base plate having features for adjusting the free end of inserted bristle tufts according to various embodiments disclosed herein.
Figure 12B:
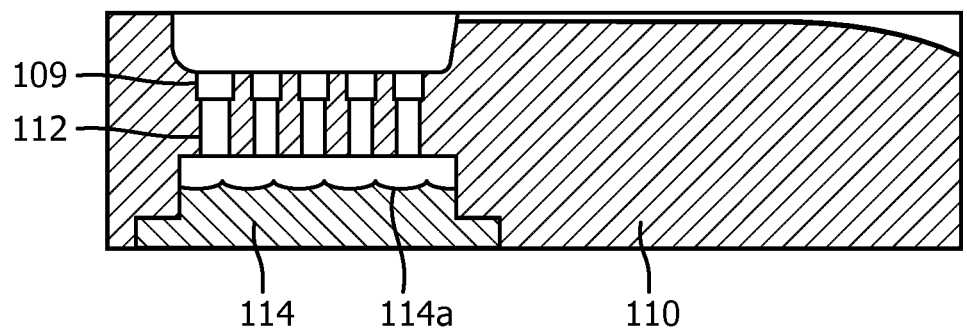
Figure 12C:
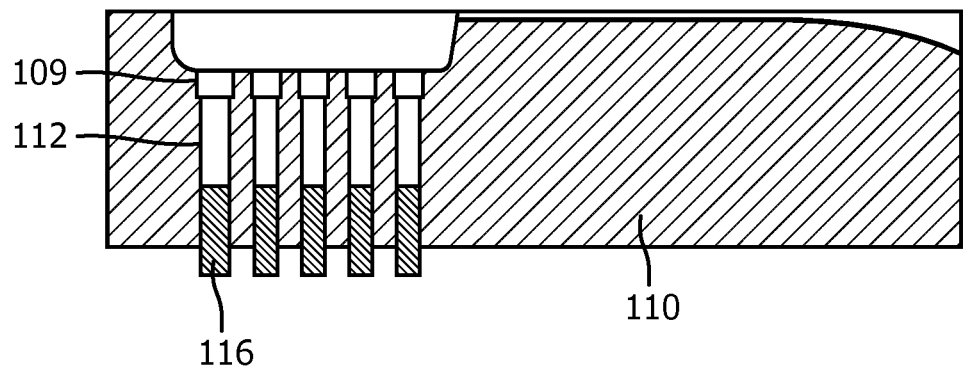

Several embodiments of features to enable adjustment of the characteristics of the free end 25 of the bristle tufts 21 can be appreciated in view of FIGS. 12A-12C. In FIG. 12A, tuft bores 112 are arranged as blind holes that terminate within the base plate 110. As discussed above, the bottom surface of the blind holes can be set as a predefined distance from openings 109, in which the retention elements 52 are be seated during tufting. That is, the bottom of each blind hole provides a stop for the portion of the bristle strands 22 that will ultimately become the free end 25 of the bristle tufts 21 in the completed brush head so that the bristle tufts 21 are maintained at the proper length during the manufacturing process. The blind holes also support the bristle strands 22 during the manufacturing process when the bristle strands 22 are inserted (e.g., via the tufting unit 130). In addition to length, the tuft bores 112 arranged as blind holes can be set to different shapes, sizes, or contours. For example, a first blind hole 118A is illustrated as slightly larger in diameter than the others, while a second blind hole 118B is illustrated as slightly shorter than the others and with a curved bottom surface to create a curved contouring for the free end 25 of the bristle tuft 21 that is inserted into the blind hole 118B.

The base plate 110 in FIG. 12B is illustrated as including a contour insert 114 also shown in FIG. 8B. As previously noted, the contour insert 114 may be used to define the shape of the free end 25 of the bristle tufts 21 in the brush head assembly 10. For example, the contour insert 114 shown in FIG. 12B would generate a finished brush head that has a shape of bristle tufts that vary in length and surface angle, as set by the tufts 21 engaging against a surface 114a of the contour insert 114. It can be appreciated that other shapes, such as a flat brushing surface, e.g., in which the free ends 25 of all the bristle tufts 21 project out the same distance, can also be achieved, based on the shape of the contour insert 114 that is used. The contour insert 114 may be arranged as a removable and interchangeable component so a variety of desired shapes of completed brush head bristles can be achieved with the same base plate 110.

In another arrangement shown in FIG. 12C, each of the tuft bores 112 may be provided with a pin 116 of the same shape and diameter as the tuft bores 112. For example, the pins 116 may be movable within the tuft bores 112 to enable the length of the tuft bores 112 to be adjustably set. Pins 116 having different surface angles on a top surface thereof can be included to change the contouring of the brushing surface resulting from the free ends 25. Thus, it is to be appreciated that the pins 116 generally serve the same purpose and function as the contour insert 114 and the blind holes 118, e.g., to form the desired shape, length, and contours of the bristle field and/or brushing surface of the completed brush head.

Figure 13A:
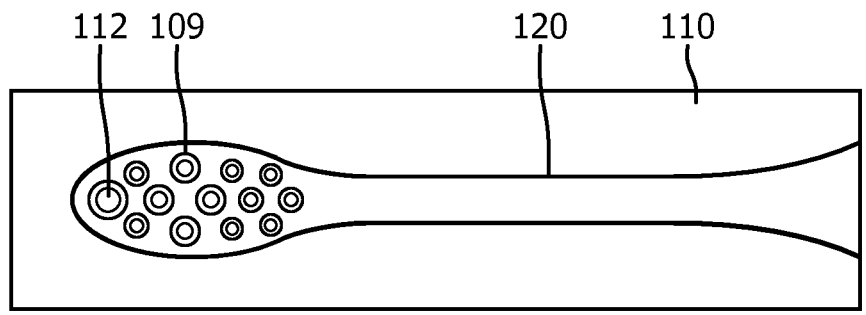
FIGS. 13A-13C illustrate a top view and two cross-sectional views of various stages of manufacturing a brush head using a base plate according to one embodiment disclosed herein.
Figure 13B:
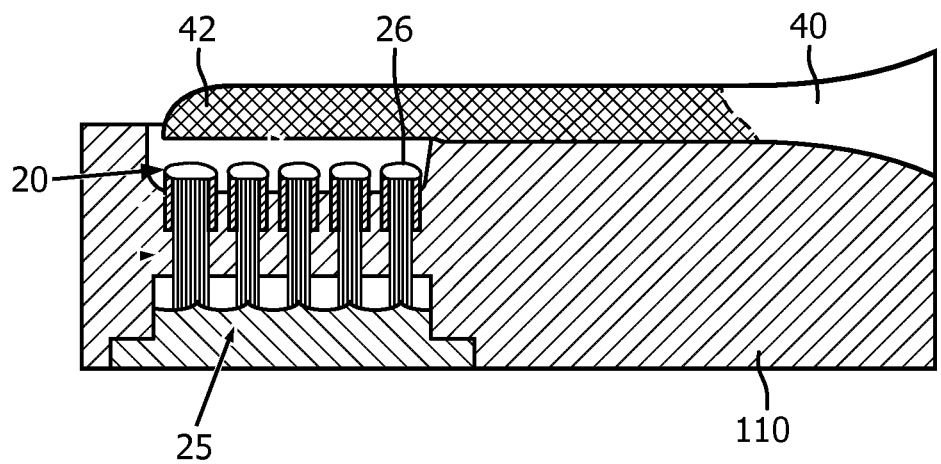
Figure 13C:
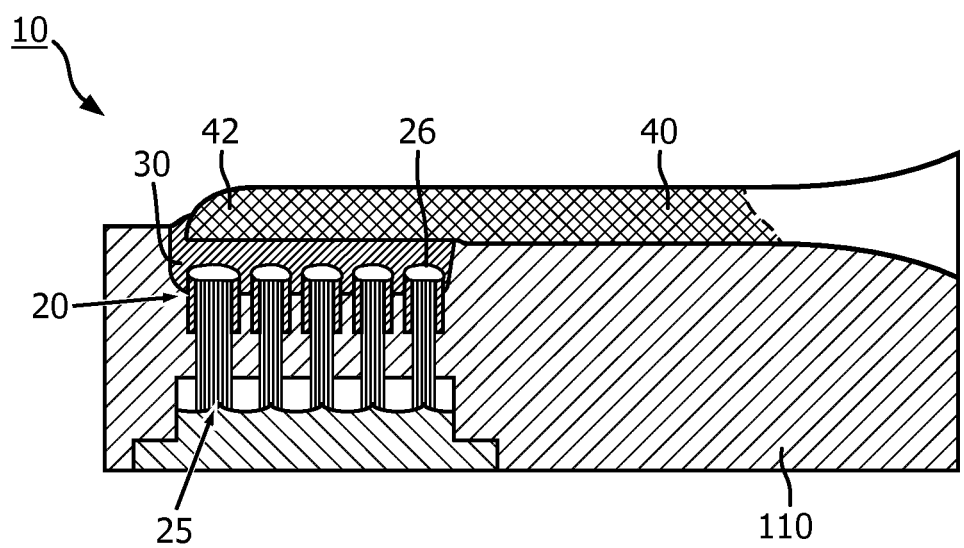

Final assembly of the brush head 10 can be appreciated in view of FIGS. 13A-13C. FIG. 13A shows a top view of the base plate 110 having the tuft bores 112 and the recesses 109 formed therein as described above, i.e., for receiving the bristle tufts 21 and the retention elements 52, respectively. In this way, after stamping, tufting, bonding, etc., the merged tuft assemblies 20 are fully formed, and can be positioned with the retention elements 52 in the recesses 109 and the free ends 25 of the bristle tufts 21 in the tuft bores 112.

The base plate 110 may also include a recess or cavity 120 in the general shape of the brush head neck 40 and/or the matrix material 30. After the merged tuft assemblies 20 are created and positioned in the base plate 110, the neck 40 may be positioned to align the platen 42 in relation to the merged proximal end head portions 26 of the tuft assemblies 20. For example, as shown in FIG. 13B, the cavity 120 may properly align the platen 42 of the neck 40 with the tuft assemblies 20 when the neck 40 is placed in the cavity 120. Additionally, any desired prefabricated parts (e.g., electronic parts, additional rings, springs, or any other components) can be added and held in position by the base plate 110 during this step of manufacturing. Any such parts can be molded into the final brush head as described in subsequent steps herein.

Figure 14A:
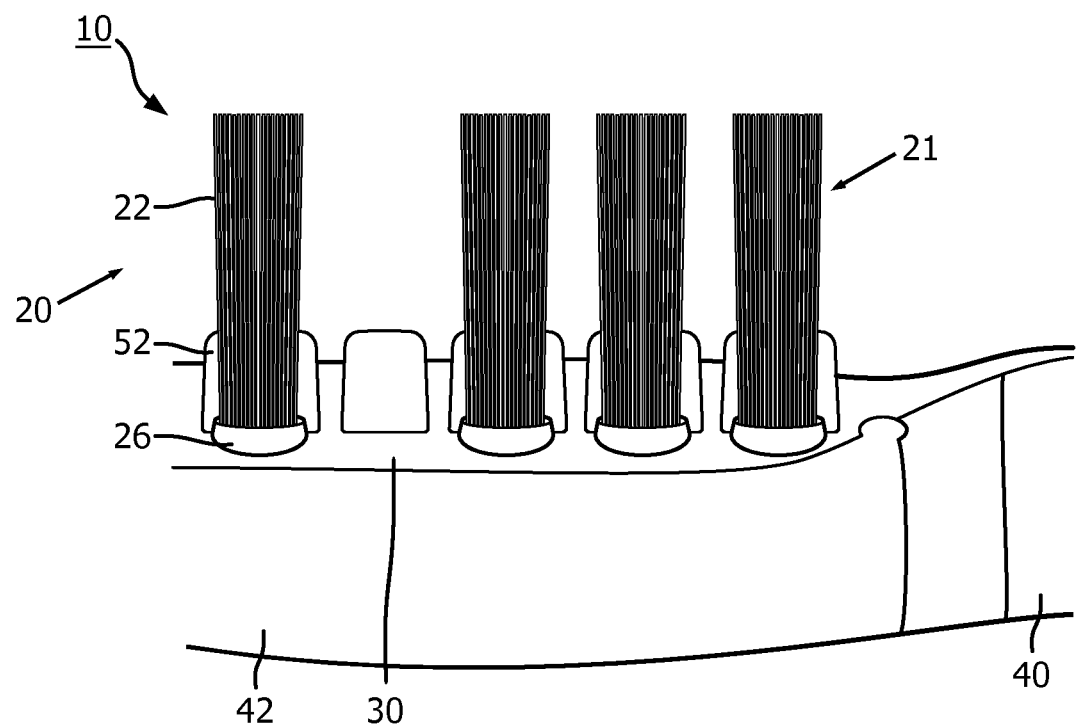
FIGS. 14A and 14B are a cross-sectional side view and a side view of brush head assemblies according to embodiments disclosed herein.
Figure 14B:
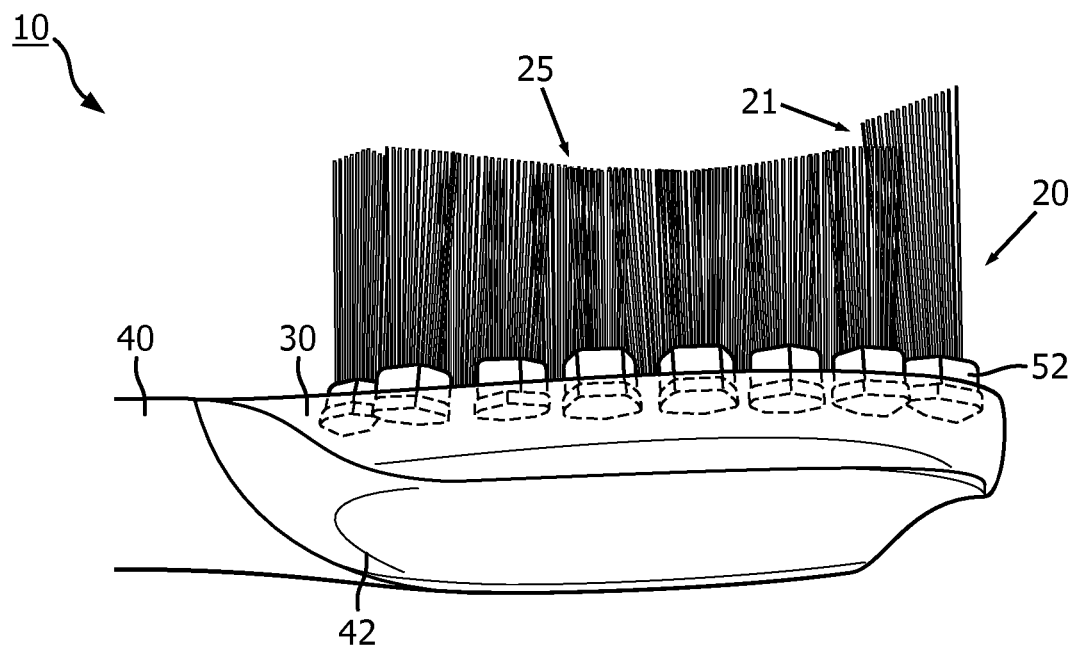

Thereafter, the components may be overmolded by the matrix material 30 by injecting material, e.g., in a liquid or flowable state, into the space formed between the platen 42 and the merged proximal end head portions 26 of the tuft assemblies 20. The matrix material 30 solidifies to secure the neck 40 and the tuft assemblies 20 together by at least partially encompassing or encapsulating the platen 42 and the tuft assemblies 20, as shown in FIG. 13C, thereby forming the brush head assembly 10. According to an embodiment, the matrix material 30 is preferably made from an elastomeric material such as a flexible thermoplastic elastomer. It is to be appreciated that in one embodiment the neck 40 is not provided as a pre-formed member, but instead that the matrix material 30 and the neck 40 are formed at the same time and by the same material by injecting a suitable material into the cavity 120. FIGS. 14A and 14B respectively illustrate additional examples of the brush head 10 when completed.

Figure 15:
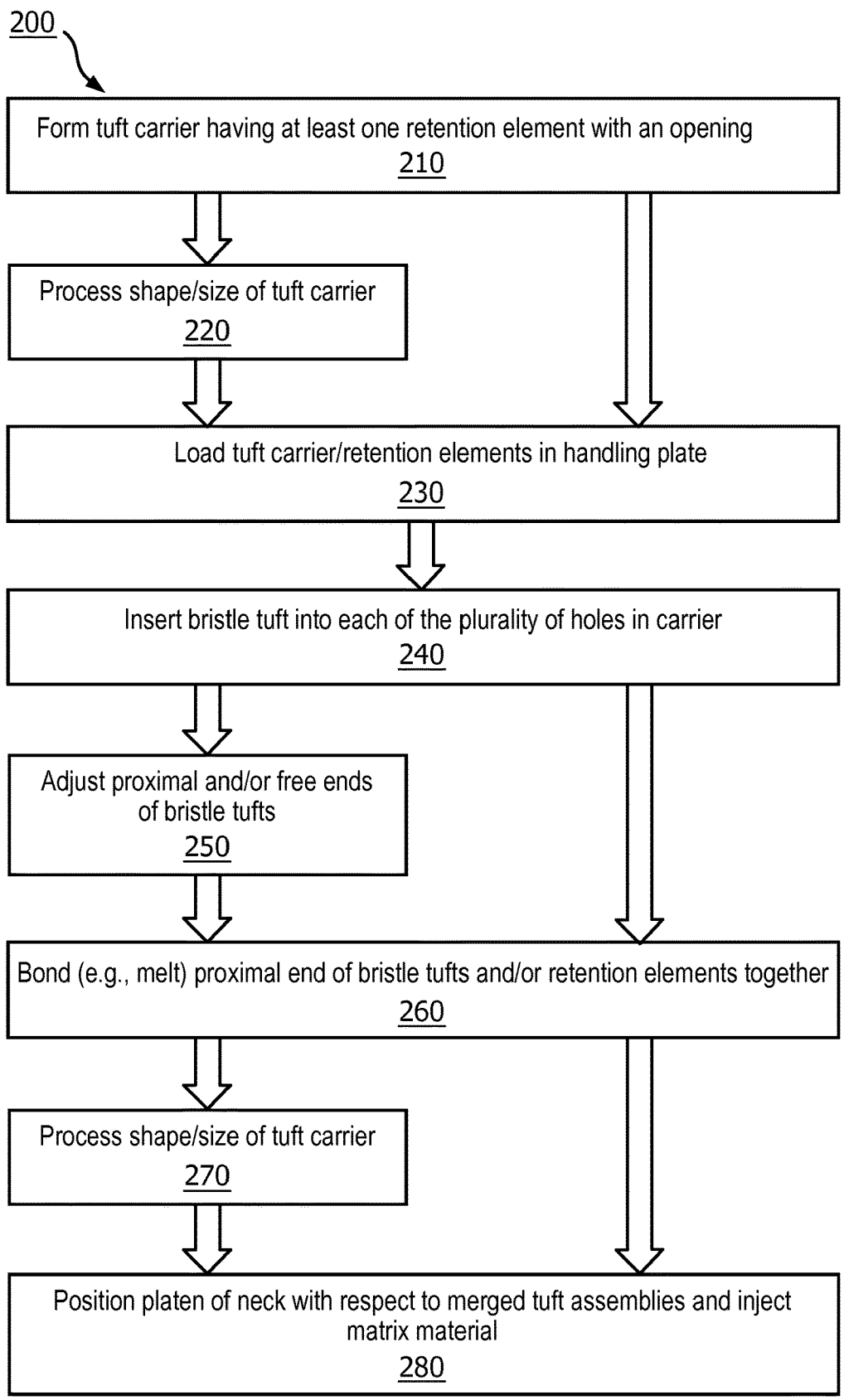
FIG. 15 is a flow chart illustrating a method of manufacturing a brush head according to one embodiment disclosed herein.

Referring to FIG. 15, in one embodiment, is a method 200 for manufacturing one or more of the various brush head embodiments 10 and implementations described or otherwise envisioned herein. In step 210, a tuft carrier (e.g., any of the tuft carriers 50) is formed, such as by molding by any known molding process. The tuft carrier includes one or more retention elements 52 having an opening formed therethrough 51.

In optional step 220 of the method 200, the tuft carrier may be processed to alter, set, or define the size or shape of the tuft carrier, or the retention elements or openings therethrough. For example, the tuft carrier may be stamped or cut to remove excess material 59. For example, the tuft carrier may be a carrier plate 54 further processed so that or one or more webbing links 55 are formed, shaped, resized, or removed in the step 220 (e.g., with the stamping tool 100, the handling plate 101, or as otherwise discussed with respect to FIGS. 4-7B).

At step 230, the retention elements of the tuft carrier, either directly after formation in step 210, or after processing in step 220, are positioned in corresponding recesses 109 of a handling plate 110. In one embodiment, the steps 220 and 230 are essentially combined in that the retention elements are directly stamped into the recesses of the handling plate simultaneously as the excess material is removed (as discussed with respect to FIGS. 4-7B).

At step 240 of the method 200, bristles are arranged in tufts and inserted (e.g., via the tufting unit 130) through the openings 51 in the retention elements 52. At optional step 250, a proximal end 23 and/or a free end 25 opposite to the proximal end of the bristle tufts 21 may be adjusted in length, shape, size, contour, etc. For example a base plate may include an adjustment feature such as a contour insert 114, or blind holes 118 and pins 116 for receiving and setting the contour of the free ends. The proximal ends of the bristle tufts may be optionally cut or trimmed to achieve a desired height using a cutting plate and a knife or cutting implement (e.g., the cutting plate 116 and the knife 117).

At step 260 of the method, the proximal end 23 of bristles 22 of the bristle tufts 21 are bonded together and/or to at least a portion of the proximal side 53 the retention element 50 to form a merged proximal end head portion 26. Once secured together by the merged proximal end head portion 26, each corresponding pair of the bristle tufts and the retention element form a merged tuft assembly 20. In one embodiment, bonding is achieved by applying heat to the proximal end of the bristle tufts, or the proximal end of the bristle tufts and the proximal end of the retention elements to melt the components together. The heat can be supplied by a by laser welding, heated air or any of a variety of other heat sources that can be in direct physical contact, merely adjacent, or directed. By making the bristle strands and the retention elements from material having the same or a similar composition, and therefore the same or similar melting point, good bonding can be facilitated.

At optional step 270, if not already done previously in the manufacturing process (e.g., at step 220), the tuft carrier can be processed to remove any excess material. For example, as discussed above with respect to step 220, this may include removing a portion or all of a carrier plate, webbing link, etc. As also discussed above, step 270 may not be performed, e.g., if the entirety of the carrier plate 54 is included in the brush head assembly 10 when fully assembled.

In step 280 of the method 200, the tuft assemblies can be inserted into the base plate (if not already installed) and a neck 40 for the brush positioned relative to the merged tuft assemblies. For example, this may include placing the neck in a corresponding cavity (120 of the base plate 110, which aligns a platen 42 portion of the brush neck 40 with respect to the tuft assemblies. After positioning, a matrix material 30 is overmolded about at least a portion of the merged tuft assemblies and the neck by injecting material into the space between the neck and the merged tuft assemblies. The matrix material 30 may include an elastomeric material. Once solidified, the matrix material at least partially encompasses or encapsulates the merged tuft assemblies and the neck together, thereby forming the brush head assembly.

In accordance with embodiments disclosed and envisioned herein, it is to be appreciated that the same handling plate or base plate (101, 110) may be utilized for multiple different manufacturing steps, such as molding, stamping, tufting, bonding, trimming/adjusting bristles, and/or overmolding. In other embodiments, partially-manufactured components may be transferred from one handling plate or base plate to a different handling plate or base plate. Additionally, it is to be appreciated that each of the steps in method 200 are optional and/or may be completed in an order other than that shown. Advantageously, these features enable flexibility in the time and location for any of the manufacturing steps, while also permitting each step to immediately follow the next if desired.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for manufacturing a brush head, the method comprising the steps of:
   molding one or more tuft carriers, having at least one retention element, the at least one retention element having an opening therethrough;
   positioning the at least one retention element of the one or more tuft carriers in openings of a handling plate;
   loading the at least one retention element into corresponding recesses of a base plate;
   inserting a bristle tuft into the opening of the at least one retention element;
   bonding a proximal end of each bristle tuft together with at least a portion of proximal side of-the at least one corresponding retention element to form a merged proximal end head portion that secures the bristle tufts and retention elements together as a merged tuft assembly;
   positioning a platen portion of a neck in relation to the merged tuft assemblies using a cavity in the base plate; and
   overmolding a matrix material in a portion of the cavity in the base plate to at least partially encompass the platen and the plurality of merged tuft assemblies.

2. The method of claim 1, further comprising removing excess material from the one or more tuft carriers, wherein the removing includes removing with a stamping tool.

3. The method of claim 2, wherein the one or more tuft carriers are removed from the handling plate as a result of the stamping.

4. The method of claim 1, wherein the bristle tuft and the at least one retention element are made of a same or similar material having the same or similar melting point.

5. The method of claim 1, wherein the opening in the at least one retention element has differing shapes, sizes, or a combination including at least one of the foregoing.

6. The method of claim 1, wherein the bonding includes using a laser or applying heat to melt the bristle tufts and the at least one retention element together into the merged proximal end head portions.

7. The method of claim 1, wherein the excess material includes some or all of a carrier plate, a webbing link, or a combination including at least one of the foregoing.

8. The method of claim 1, wherein the at least one retention element is loaded into the base plate interconnected by a carrier plate, a webbing link, or a combination including at least one of the foregoing.

* * * * *